United States Patent
Parnoutsoukian et al.

(10) Patent No.: US 11,092,206 B2
(45) Date of Patent: Aug. 17, 2021

(54) ELECTRICALLY CONDUCTIVE MECHANICAL VIBRATION ISOLATOR

(71) Applicant: Ford Global Technologies, LLC, Dearborn, MI (US)

(72) Inventors: Hagop Parnoutsoukian, Dearborn, MI (US); Yitshak Isaac Henig, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 198 days.

(21) Appl. No.: 15/722,478

(22) Filed: Oct. 2, 2017

(65) Prior Publication Data
US 2019/0101177 A1    Apr. 4, 2019

(51) Int. Cl.
| | |
|---|---|
| *F16F 1/373* | (2006.01) |
| *F16F 1/38* | (2006.01) |
| *F16F 3/12* | (2006.01) |
| *H01R 35/02* | (2006.01) |
| *H01B 5/16* | (2006.01) |
| *F16F 7/116* | (2006.01) |
| *F16F 1/371* | (2006.01) |
| *F16F 15/02* | (2006.01) |

(Continued)

(52) U.S. Cl.
CPC .............. *F16F 1/3849* (2013.01); *B60K 5/12* (2013.01); *B60K 5/1208* (2013.01); *F16F 1/371* (2013.01); *F16F 3/12* (2013.01); *F16F 7/116* (2013.01); *F16F 15/022* (2013.01); *H01B 5/16* (2013.01); *H01R 35/02* (2013.01); *H01R 33/975* (2013.01); *H02G 7/04* (2013.01); *H02G 7/14* (2013.01)

(58) Field of Classification Search
CPC .... F16F 1/36; F16F 1/38; F16F 1/3873; F16F 9/535; F16C 41/002; B60K 5/1208
See application file for complete search history.

(56) References Cited

U.S. PATENT DOCUMENTS

| | | | | |
|---|---|---|---|---|
| 3,959,617 A | * | 5/1976 | Hults ...................... | H01H 3/62 200/305 |
| 4,109,126 A | * | 8/1978 | Halbeck ................... | H01H 9/12 200/302.3 |

(Continued)

OTHER PUBLICATIONS

Wikipedia, Bushing (Isolator), Aug. 22, 2017, pp. 1-3.

(Continued)

*Primary Examiner* — Bradley T King

(57) ABSTRACT

The disclosed inventive concept provides an electrically conductive mechanical vibration isolator for providing an electrical path between parts of a vehicle in order to alleviate the need for ground straps. The conductive isolator disclosed herein includes an inner shell, an outer shell, an elastomer disposed therebetween, and a conductor interconnecting the inner and outer shells to create an electrical path therebetween. In one embodiment, the conductor is at least one conducting wire having opposite ends electrically bonded to the inner and outer shells. In another embodiment, the elastomer may comprise a plurality of conductive particulates distributed throughout the elastomer. In yet another embodiment the elastomer may include at least one channel formed therein and extending between the inner and outer shells for storing a conductive liquid therein. The conductive liquid is contained between the shells and provides an electrical path therebetween.

6 Claims, 8 Drawing Sheets

(51) Int. Cl.
    *B60K 5/12*            (2006.01)
    *H02G 7/04*           (2006.01)
    *H02G 7/14*           (2006.01)
    *H01R 33/975*       (2006.01)

(56) References Cited

U.S. PATENT DOCUMENTS

| | | | | |
|---|---|---|---|---|
| 4,222,029 A * | 9/1980 | Marquis, III | | B60K 13/02 |
| | | | | 210/90 |
| 4,869,476 A * | 9/1989 | Shtarkman | | F16F 13/30 |
| | | | | 267/140.14 |
| 4,988,071 A * | 1/1991 | Shimazaki | | F16F 1/3863 |
| | | | | 248/666 |
| 5,176,368 A * | 1/1993 | Shtarkman | | F16F 13/16 |
| | | | | 188/267.2 |
| 5,284,330 A * | 2/1994 | Carlson | | F16F 9/535 |
| | | | | 188/267.2 |
| 5,473,484 A * | 12/1995 | Dunfield | | G11B 19/2009 |
| | | | | 360/99.08 |
| 5,492,312 A * | 2/1996 | Carlson | | F16F 9/535 |
| | | | | 188/267.2 |
| 5,788,029 A * | 8/1998 | Smith | | F16F 7/1005 |
| | | | | 188/267 |
| 6,002,588 A * | 12/1999 | Vos | | F16F 7/14 |
| | | | | 361/708 |
| 6,132,633 A * | 10/2000 | Carlson | | H01F 1/447 |
| | | | | 252/62.52 |
| 6,202,806 B1 * | 3/2001 | Sandrin | | A63B 21/0056 |
| | | | | 188/267 |
| 6,886,669 B1 * | 5/2005 | Platner | | B60G 17/0157 |
| | | | | 188/267.1 |
| 7,261,834 B2 * | 8/2007 | Fuchs | | F16F 1/3605 |
| | | | | 252/62.53 |
| 8,870,550 B2 * | 10/2014 | Tozawa | | F04B 39/121 |
| | | | | 417/360 |
| 9,051,986 B2 * | 6/2015 | Modrzejewski | | F16F 9/532 |
| 9,548,144 B2 | 1/2017 | Blazic | | |
| 9,589,698 B2 | 3/2017 | Anhalt et al. | | |
| 9,724,546 B2 | 8/2017 | Huggins et al. | | |
| 2002/0175594 A1 * | 11/2002 | Kornbluh | | B60G 17/01941 |
| | | | | 310/317 |
| 2003/0037997 A1 * | 2/2003 | Sakata | | F16F 13/305 |
| | | | | 188/71.5 |
| 2004/0126565 A1 * | 7/2004 | Naganathan | | F16F 1/361 |
| | | | | 428/323 |
| 2005/0175266 A1 * | 8/2005 | Noack | | F16C 17/02 |
| | | | | 384/277 |
| 2006/0137587 A1 * | 6/2006 | Aisenbrey | | F41H 3/00 |
| | | | | 114/65 R |
| 2007/0114486 A1 * | 5/2007 | Takeuchi | | F16J 15/43 |
| | | | | 252/62.52 |
| 2010/0130037 A1 | 5/2010 | Kotowicz | | |
| 2012/0019973 A1 * | 1/2012 | Ehrmantraut | | B64D 45/02 |
| | | | | 361/218 |
| 2015/0083456 A1 | 3/2015 | Chen et al. | | |
| 2018/0274624 A1 * | 9/2018 | Karpenko | | F16F 15/085 |
| 2019/0170206 A1 * | 6/2019 | Inoue | | F16F 9/535 |

OTHER PUBLICATIONS

Rowe, Richard, How Does a Car Ground Strap Work?, Aug. 22, 2017, pp. 1-3.
Wikipedia, Conductive Elastomer, Aug. 29, 2017, p. 1.

* cited by examiner

ELECTRICALLY CONDUCTIVE MECHANICAL VIBRATION ISOLATOR

TECHNICAL FIELD

The disclosed inventive concept pertains to components, such as vehicle components. More particularly, the disclosed inventive concept concerns mechanical vibration isolators. Even more particularly, the disclosed inventive concept pertains to electrically conductive mechanical vibration isolators for providing an electrical path between a support structure and a mechanically isolated electrical component.

BACKGROUND OF THE INVENTION

In a vehicle's direct current system, electrons flow in a single direction to create a complete electrical path. In doing so, electrons flow out of one of the battery's terminals, through the vehicle's electrical system, including the ignition system, lights, dashboard, and any other electrically-powered components, and back into the battery at its other terminal.

To avoid using an excessive amount of wire in order to place the electrical components in direct connection with the battery, the components can be placed in electrical connection with a support structure, such as the vehicle's chassis, frame, or engine block, which is in electrical communication with the battery. As a result, the amount of wire used in manufacturing the vehicle is approximately reduced by half.

Typically, in creating this electrical path between the electrical components and their associated support structures, a plurality of ground straps, cables, or wires is employed. Ground straps are generally ribbons of braided steel that lack any sort of insulation. However, over time, ground straps become worn and break due to constant movement and vibration of the engine and general degradation. This results in the electrical path being broken and the performance of any electrical components connected thereto being affected.

Common failures resulting from a defective or damaged ground strap include a dead battery, hard starting, cylinder misfiring, poor fuel economy, and the check engine light being illuminated, among other problems affecting the starter motor, alternator, ignition system, and the like.

In addition, ground straps and their associated fasteners increase the weight of a vehicle as well as its cost, while also complicating the manufacturing process itself which increases the possibility of electrical failure.

There have been attempts at providing an alternative to using ground straps while still providing a complete electrical circuit between the electrical components and the battery. Such devices are disclosed in U.S. Pat. Nos. 4,222,029 and 9,548,144 and U.S. Patent Application Publication Nos. 2010/0130037 and 2015/0083456. Each of the devices disclosed therein teaches utilizing various vibration isolators positioned between components of a vehicle in order to provide an electrical path therebetween.

Vibration isolators, such as bushings, engine mounts, motor mounts, battery mounts and other electric modules that require grounding in electric vehicles and the like, are placed between two metal objects for minimizing the transmission of noise and small vibrations throughout the vehicle. Vibration isolators generally include an inner and an outer metal sleeve, tube, or shell with a flexible medium, such as rubber or polyurethane, disposed therebetween. Thus, movement between the two metal objects contacting the vibration isolator is minimized as the flexible medium absorbs the kinetic energy emanating therefrom and prevents the kinetic energy from transferring to the rest of the vehicle.

However, the devices disclosed in the above references are generally intricate and overly complex. Therefore, in view of the state of the art, it may be advantageous to provide a simple and cost-efficient electrically conductive mechanical vibration isolator for creating an electrical path between an electrical component and a support structure.

As in so many areas of vehicular technology, there is always room for improvement related to vibration isolators and means for creating an electrical path between various components of a vehicle.

SUMMARY OF THE INVENTION

The disclosed inventive concept overcomes the problems associated with known electrical conductors and vibration isolators by providing an electrically conductive mechanical vibration isolator. The disclosed inventive concept offers the significant general advantage of removing the need for requiring ground straps, thereby reducing the costs of manufacturing and servicing a vehicle, in addition to the weight and cost of the vehicle itself.

Particularly, the disclosed inventive concept provides a conductive isolator comprising an inner shell, an outer shell, and an elastomer disposed therebetween. Preferably, the inner and outer shells each have a long axis and are aligned coaxially with one another along their long axes.

In one embodiment, the conductor is a conductive wire having opposite ends bonded to the inner and outer shells. As a result, when the disclosed inventive concept is placed in position, for example between an electrical component and a vehicle support structure, an electrical path is created therebetween.

Preferably, the wire is coiled around and circumnavigates the inner shell with one end of the wire electrically bonded to the inner shell and the opposite end electrically bonded to the outer shell.

Alternatively, the wire need not encircle the inner shell and may be configured in either a coiled or uncoiled manner. Opposite ends of the wire are then attached by any suitable means to the inner and outer shells to create an electrical path therebetween.

It is to be understood that the wire may be partially or fully encapsulated in the elastomer. Alternatively, a pocket or space may be formed within the elastomer in which the wire is positioned within.

Furthermore, the disclosed inventive concept is not limited to utilizing a single conductor or wire. As such, any number of wires, including a combination of both coiled and straight wires, may be employed to interconnect the inner and outer shells. Doing so improves the conductivity of the conductive isolator and the length of the useful life thereof.

In another embodiment, the elastomer itself may function as the conductor, thereby eliminating the need for a conductive wire. Conductive elastomers are provided by injecting conductive particles into an elastomer during fabrication to form this embodiment. Thus, the elastomer itself provides the electrical path between the inner and outer shells.

In yet another embodiment, the disposed inventive concept provides a conductive isolator comprising an elastomer disposed between an upper washer and a lower washer. Additionally, a conductor, such as a wire, extends within the elastomer in order to interconnect the upper and lower washers at opposing ends of the conductor. Thus, an electrical path is created between the upper and lower washes, similar to that discussed above with respect to the inner and outer shells.

In yet a further embodiment, the disclosed inventive concept provides a conductive isolator comprising an inner shell, an outer shell, and an elastomer disposed therebetween. The elastomer has at least one through bore defining a channel or chamber formed therein which extends between the inner and outer shells. The conductive isolator further comprises an electrically conductive liquid stored within the channel for creating an electrical path between the inner and outer shells.

It is to be understood that the elastomer may include any number of channels formed therein for increasing the amount of conductive liquid that can be stored between the inner and outer shells.

The above advantages, in addition to other advantages and features, will be readily apparent from the following detailed description of the invention when taken in connection with the accompanying drawings.

BRIEF DESCRIPTION OF THE DRAWINGS

For a more complete understanding of this disclosed inventive concept, reference should now be made to the embodiments illustrated in greater detail in the accompanying drawings and described below by way of examples of the disclosed inventive concept wherein.

DETAILED DESCRIPTION OF THE INVENTION

Figure 1:
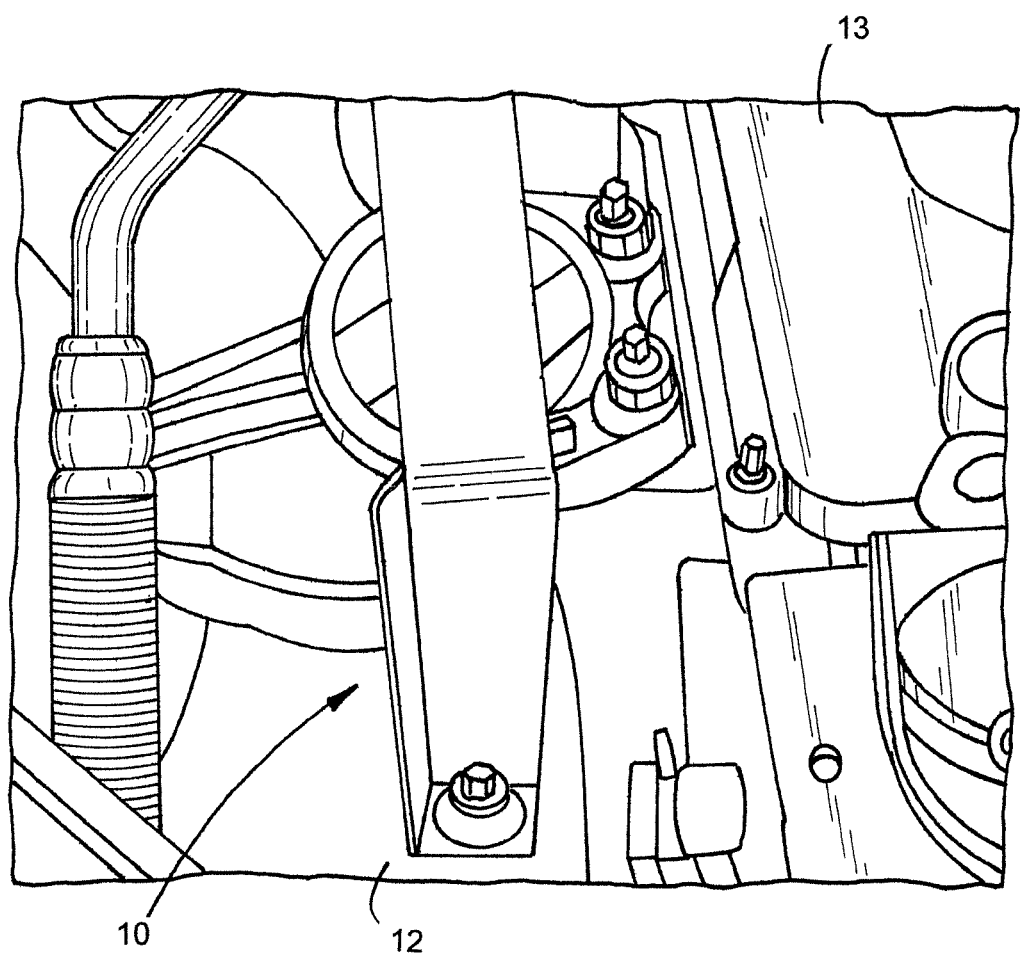
FIG. 1 is an environmental view showing an electrically conductive mechanical vibration isolator assembly in accordance with the disclosed inventive concept positioned between a vehicle support structure and an engine.

In the following figures, the same reference numerals will be used to refer to the same components. In the following description, various operating parameters and components are described for different constructed embodiments. These specific parameters and components are included as examples and are not meant to be limiting.

In accordance with the disclosed inventive concept and with reference to FIG. 1 of the drawings, there is provided an electrically conductive mechanical vibration isolator assembly 10 positioned between a vehicle support structure 12 and an engine 13 (or motor if the vehicle is an electric-powered vehicle or hybrid). However, it is to be understood that the disclosed inventive concept is not limited to this specific location on a vehicle and may be repositioned to any other suitable location where an electrical path may be required.

As described in more detail below, the conductive isolator assembly 10 has particular utility in providing an electrical path or continuity between electrical components and the vehicle support structure 12. However, the conductive isolator assembly 10 is not limited to being used in a vehicle and other uses in which an electrical path is required falls within the scope of the disclosed inventive concept.

Figure 2:
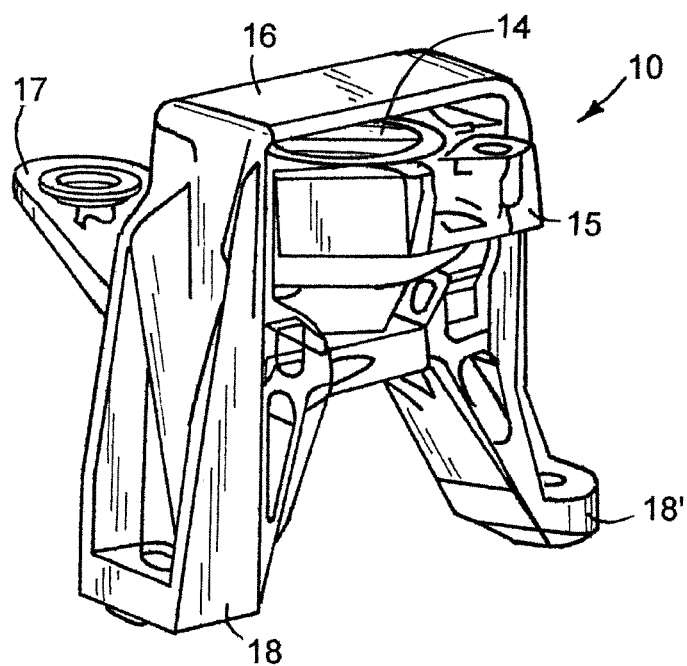
FIG. 2 is a first side perspective view of the conductive isolator assembly illustrated in FIG. 1 including brackets for mounting the conductive isolator to the vehicle support structure and the engine.
Figure 3:
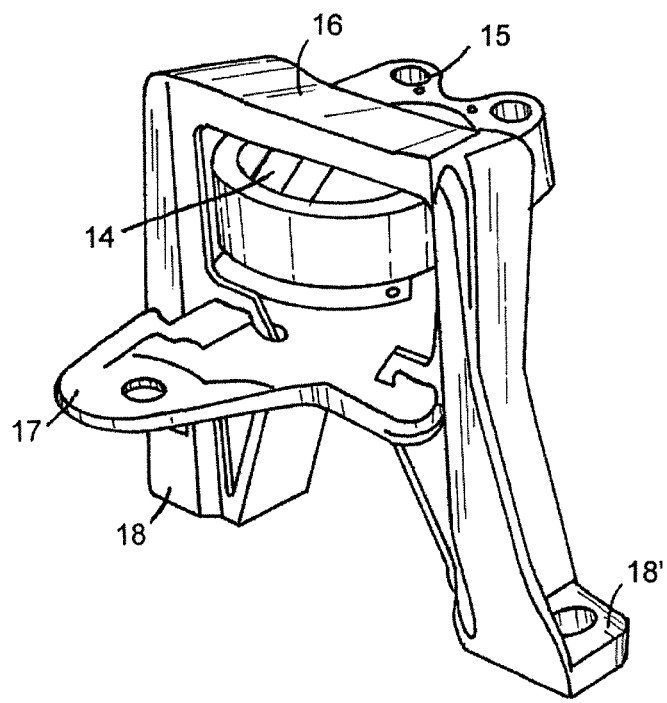
FIG. 3 is a second side perspective view of the conductive isolator assembly as seen opposite that of FIG. 2.

As shown in FIGS. 2 and 3, the conductive isolator assembly 10 is shown separate from a vehicle. The conductive isolator assembly 10 comprises a conductive isolator 14, an engine attachment bracket 15, a first support bracket 16, and a second support bracket 17. The engine attachment bracket 15 encircles an outer portion of the conductive isolator 14 and may be integrally formed therewith. The engine attachment bracket 15 is attached to an electrical component, such as the engine 13, via a pair of mechanical fasteners, such as a nut and stud arrangement. The first support bracket 16 includes a pair of spaced-apart attachment legs 18, 18'. The first support bracket 16 and the second support bracket 17 are also attached to the vehicle support structure 12 via a plurality of mechanical fasteners, such as nut and stud arrangements. It is to be understood that the disclosed inventive concept is not limited to being used in combination with the specific brackets illustrated and other suitable means for attaching the disclosed inventive concept to a vehicle may be utilized.

Figure 4:
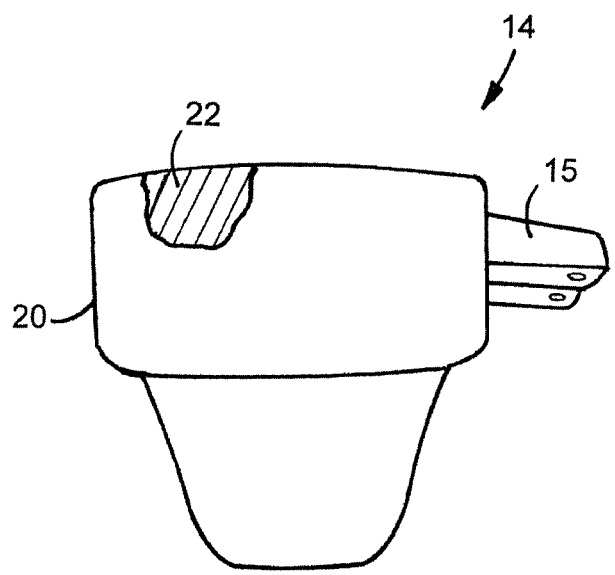
FIG. 4 is a side view of a conductive isolator of the conductive isolator assembly of FIG. 1.
Figure 5:
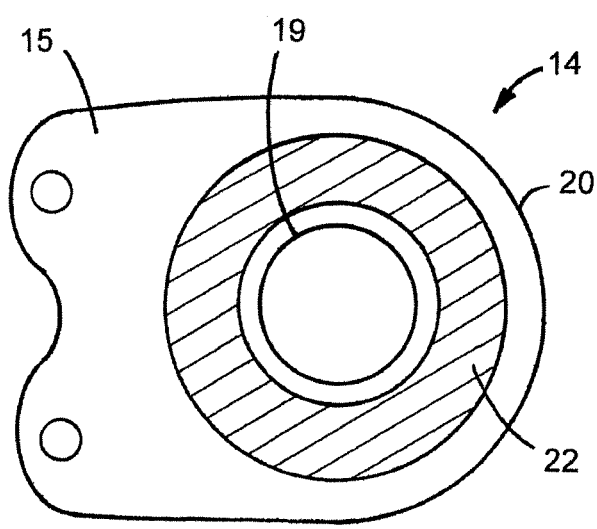
FIG. 5 is a top view of the conductive isolator of the conductive isolator assembly of FIG. 1.

With more particularity and as shown in FIGS. 4 and 5, the conductive isolator 14 comprises an inner shell 19, an outer shell 20, and an elastomer 22 disposed therebetween. The engine attachment bracket 15 is shown as being integrally formed with the outer shell 20.

The conductive isolator 14 is illustrated as a bushing, which may also be referred to as a flexible mounting or vibration absorption mounting, throughout the ensuing description. However, it is to be understood that the disclosed inventive concept may be employed with any other suitable vibration isolator mount, such as an engine mount, motor mount, battery mount, and any electric module that requires grounding in electric vehicles.

The inner shell 19, also referred to as a "crush tube" in a bushing, protects the conductive isolator 14 from being crushed during use on a vehicle. The outer shell 20 functions as a casing for protecting the elastomer 22 from coming into contact with surrounding components of a vehicle.

For reasons discussed below, the material from which the inner shell 19 and the outer shell 20 are manufactured from is a conductive metallic material. Thus, the inner shell 19 and the outer shell 20 are manufactured from any suitable material, such as iron, steel (including stainless steel), copper, aluminum, chromate, nickel, and the like. Both the inner shell 19 and the outer shell 20 have a long axis. Preferably, the long axis of the inner shell 19 and the long axis of the outer shell 20 are coaxially with one another.

The elastomer 22 maintains the spacing between the inner shell 19 and the outer shell 20 while damping the energy transmitted through the conductive isolator 14 during use. The elastomer 22 may be selected from any material having high resistivity such as silicone, rubber, polyurethane, fluoropolymer, and the like. Suitable rubbers include natural rubber, synthetic rubber, black rubber, butyl rubber, ethylene propylene diene monomer (EPDM) rubber, and the like.

Figure 6:
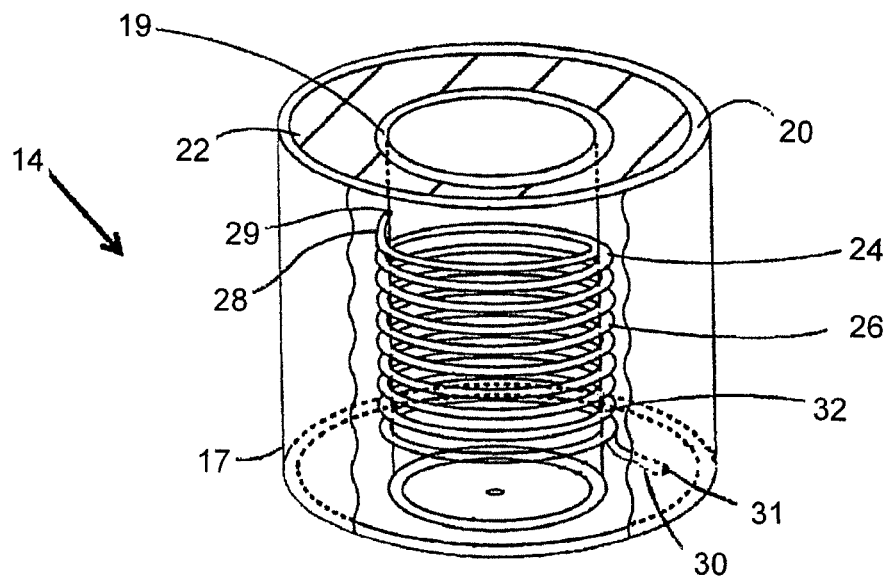
FIG. 6 is a perspective view of an electrically conductive mechanical vibration isolator in accordance with the disclosed inventive concept including a coiled conductive wire.

As noted above, the conductive isolator 14 hereof is illustrated as a bushing or other flexible mounting for damping vibration between components of a vehicle. As such, it is desired that the conductive isolator 14 be capable of providing an electrical path between surrounding components in order to alleviate the need for ground straps. Therefore, as shown in FIG. 6, the conductive isolator 14 is illustrated without the brackets 15, 16, 17 and further comprises a conductor interconnecting the inner shell 19 and the outer shell 20.

In one embodiment, the conductor is a conductive wire 24 and illustrated by removing a portion of the outer shell 20. The conductive wire 24 is fabricated from any conductive metallic material, such as, iron, steel (including stainless steel), copper, aluminum, chromate, nickel, and the like. The wire 24 may also be manufactured from any combination thereof when the wire 24 is finished, coated, or plated. For example, the material construction of the wire 24 may include a copper structure that is finished with aluminum or chromate, a copper structure that is electro or electro-less nickel plated, a stainless steel structure that is electro or electro-less nickel plated, and the like.

The conductive wire 24 includes a body 26 having a first end 28 and a second end 30. The first end 28 and the second end 30 of the wire 24 are bonded to the inner shell 19 and the outer shell 20, respectively, by any suitable means, such as soldering, ultrasonic welding, crimping, or by using a rivet, bolt, and the like. As shown, the first end 28 of the wire 24 is bonded to the inner shell 19 at a first contact point 29 and the second end 30 of the wire 24 is bonded to the outer shell 20 at a second contact point 31.

However, it is to be understood that the first end 28 and the second end 30 of the wire 24 may be bonded to either the inner shell 19 or the outer shell 20 without limiting the scope of the disclosed inventive concept. Furthermore, the first end 28 and the second end 30 may be electrically bonded to the inner shell 19 and the outer shell 20 at any suitable location thereon.

In electrically bonding the first end 28 and the second end 30 of the wire 24 to the conductive inner shell 19 and the outer shell 20, an electrical path is thereby created. Thus, the electrical path flows between an electrical component, such as the engine 14, and the vehicle support structure 12, such as the chassis or frame. In doing so, it is understood that the engine 14 is either in direct or indirect contact with the outer shell 20, and the vehicle support structure 12 is in direct contact with the inner shell 19. Alternatively, the engine 14 and the vehicle support structure 12 may be rearranged such that the engine 14 contacts the inner shell 19 and the vehicle support structure 12 contacts the outer shell 20. It is to be understood that the relationship between the various vehicular parts forming the completed electrical path are only made for exemplary purposes and any other desired components may be placed in contact with the inner shell 19 and the outer shell 20 in order to provide an electrical path therebetween.

As shown in FIG. 6, the body 26 of the conductive wire 24 is repeatedly wound around and circumnavigates the exterior of the inner shell 19 to provide a plurality of windings 32 formed therein. In this coiled configuration, the wire 24 encircles the inner shell 19 and extends along at least a portion of the length thereof. This allows the wire 24 to withstand vibrations exhibited within the conductive isolator 14 during use by allowing the wire 24 to move in all three axes without restriction or interference on the electrical path created.

As shown, each one of the windings 32 has a substantially similar diameter. However, it is understood that the diameter of the windings 32 closer to one end of the wire 24 may be larger than the diameter of the windings 32 closer to the opposite end of the wire 24 in order to be within closer proximity to the outer shell 20.

Figure 7:
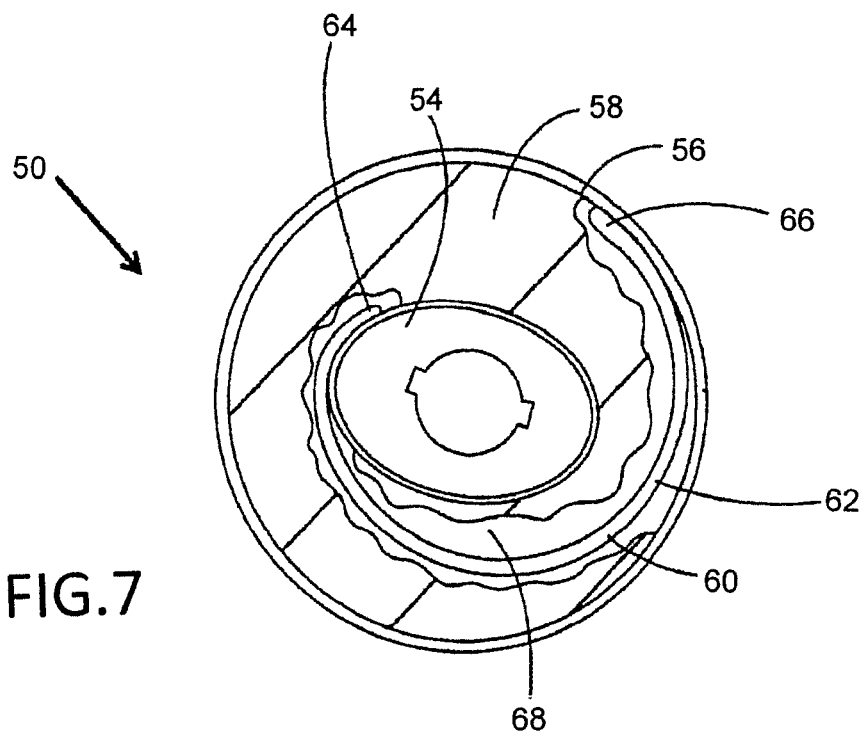
FIG. 7 is a bottom view of another embodiment of an electrically conductive mechanical vibration isolator in accordance with the disclosed inventive concept including an uncoiled conductive wire.

In another embodiment of the disclosed inventive concept, a conductive isolator 50 is shown in FIG. 7. The conductive isolator 50 comprises an inner shell 54, an outer shell 56, and an elastomer 58 disposed therebetween. It is to be understood that the inner shell 54, the outer shell 56, and the elastomer 58 are identical to like components described above.

Similarly, the conductive isolator 50 comprises a conductor such as a conductive wire 60 having a body 62, a first end 64, and a second end 66. However, the body 62 is an arcuate member without any windings formed therein, unlike the coiled body 26 of the wire 24 discussed above. Still, the first end 64 and the second end 66 are electrically bonded to the inner shell 54 and the outer shell 56, respectively, in any suitable manner in order to create an electrical path therebetween.

The conductive wire 60 may be at least partially encapsulated in the elastomer 58 or, alternatively, a space or pocket 68 may be formed within the elastomer 58 and the wire 60 positioned therein. It is to be understood that the pocket 68 may be provided in the elastomer of any embodiment discussed herein.

Additionally, the body 62 of the wire 60 is flexible and has sufficient slack between the first end 64 and the second end 66 thereof such that, when the conductive isolator 50 operates within its full range of motion, the first end 64 and the second end 66 do not become detached from the inner shell 54 and the outer shell 56.

Figure 8:
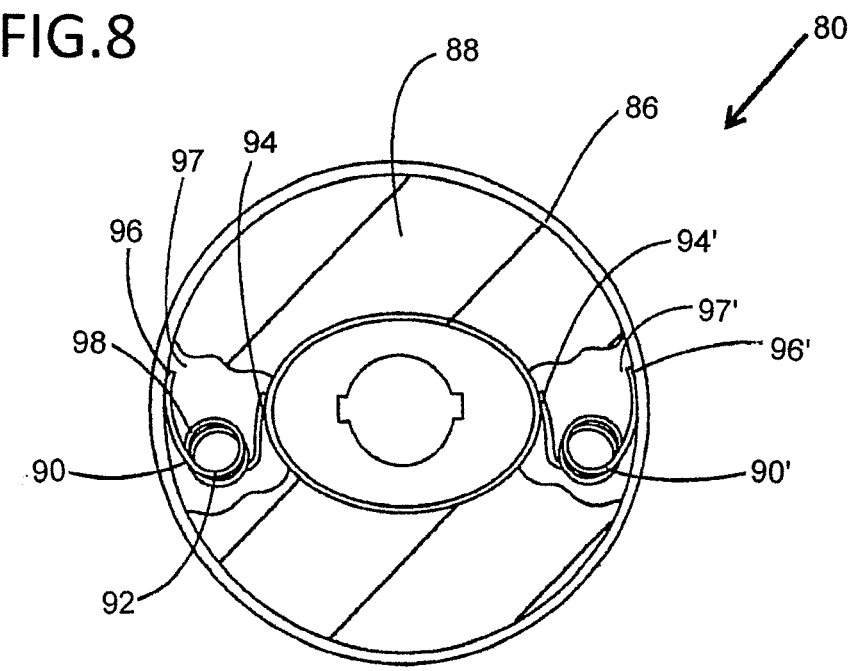
FIG. 8 is a top view of yet another embodiment of an electrically conductive mechanical vibration isolator in accordance with the disclosed inventive concept including a pair of conductive wires.

In yet another embodiment of the disclosed inventive concept, a conductive isolator 80 is shown in FIG. 8. The conductive isolator 80 comprises an inner shell 84, an outer shell 86, and an elastomer 88 disposed therebetween. It is to be understood that the inner shell 84, the outer shell 86, and the elastomer 88 are identical to like component described above.

Similarly, the conductive isolator 80 comprises a conductor such as a conductive wire 90 having a body 92, a first end 94, and a second end 96. Here, the body 92 is coiled, similar to the wire 24 discussed above, and includes a plurality of windings 98 formed therein. However, the coiled body 92 does not circumnavigate the inner shell 19, but, instead, is positioned on one side of the inner shell 84.

As with the coiled wire 24 described above, the first end 94 and the second end 96 are electrically bonded between the inner shell 84 and the outer shell 86 in any suitable manner in order to create an electrical path therebetween. Additionally, the windings 98 allow the wire 90 to withstand movement of the conductive isolator 80 while in use and prevent the first end 94 and the second end 96 from becoming detached from the inner shell 84 and the outer shell 86.

It is to be understood that the conductive isolator 80 hereof may include any number of conductors or wires. As shown, the conductive isolator 80 includes a pair of conductive wires 90, 90' positioned on opposite sides of the inner shell 84. Each wire 90, 90' is separately connected to the inner shell 84 and the outer shell 86 at opposite ends 94, 96, 94', 96' thereof. This provides improved conductivity between the inner shell 84 and the outer shell 86 and, further, increases the life span of the conductive isolator 80 by avoiding the need for repair in the possible event that one of the wires 90, 90' fails.

Moreover, each wire 90, 90' is shown positioned within a respective pocket 97, 97' formed in the elastomer 88. However, it is understood that one or both of the wires 90, 90' may be partially or fully encapsulated therein as well.

Figure 9:
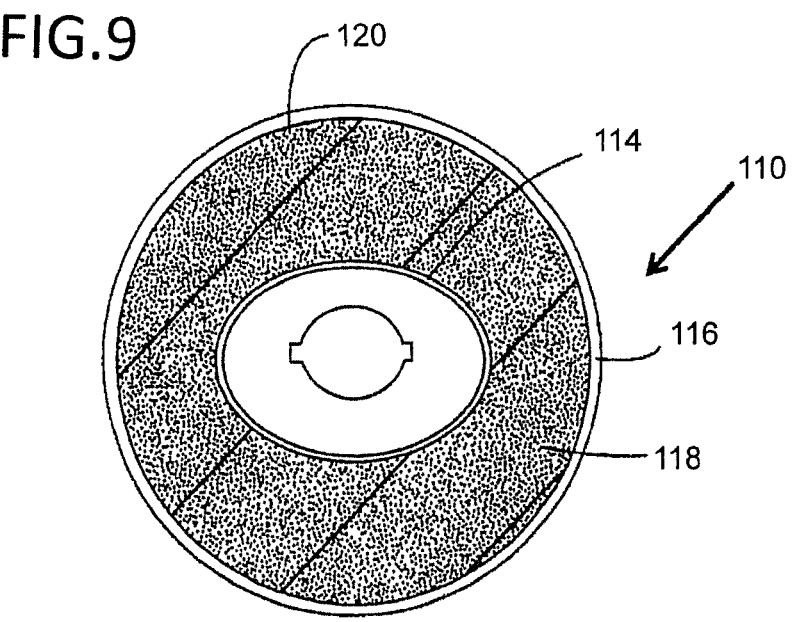
FIG. 9 is a top view of yet another embodiment of an electrically conductive mechanical vibration isolator in accordance with the disclosed inventive concept including a conductive elastomer.

In yet a further embodiment of the disclosed inventive concept, a conductive isolator 110 is shown in FIG. 9. The conductive isolator 110 comprises an inner shell 114, an outer shell 116, and an elastomer 118 disposed therebetween. Here, instead of providing a conductor extending through the elastomer 118, as discussed in the above embodiments, the elastomer 118 itself functions as the conductor.

Conductive elastomers reduce or eliminate electromagnetic interference (EMI) and radio frequency interference (RFI) often associated with electronics. In fabricating conductive elastomers, conductive solid particulates are finely distributed and homogeneously dispersed throughout a polymer or elastomer material. As a result, the conductivity of the elastomer extends as a property of the entire fabricated material, and not just surface conductivity or antistatic finishing.

The elastomer 118 is a conductive elastomer comprising a mixture of a base material and a conductive material. The conductive material comprises a plurality of conductive particulates 120, such as carbon, silver aluminum, silver glass, silver copper, nickel graphite, and the like, or any combination thereof.

The concentration of conductive particulates 120 in the conductive elastomer 18, in volume percentage, is directly based on the type of base material used. In silicone elastomers, the preferred percentage of the conductive particulates 120 by volume ranges from about 10% to about 25%, and, more preferably, from about 15% to about 22%. In thermoplastic elastomers, the preferred percentage of the conductive particulates 120 by volume ranges from about 5% to about 30%, and, more preferably, from about 7% to about 25%. In polyurethane elastomers, the preferred percentage of the conductive particulates 120 by volume ranges from about 5% to about 30%, and, more preferably, from about 10% to about 25%. By utilizing this conductive elastomer 118, an electrical path is provided between the inner shell 114 and the outer shell 116 without the use of an additional wire or other conductive element.

Figure 10:
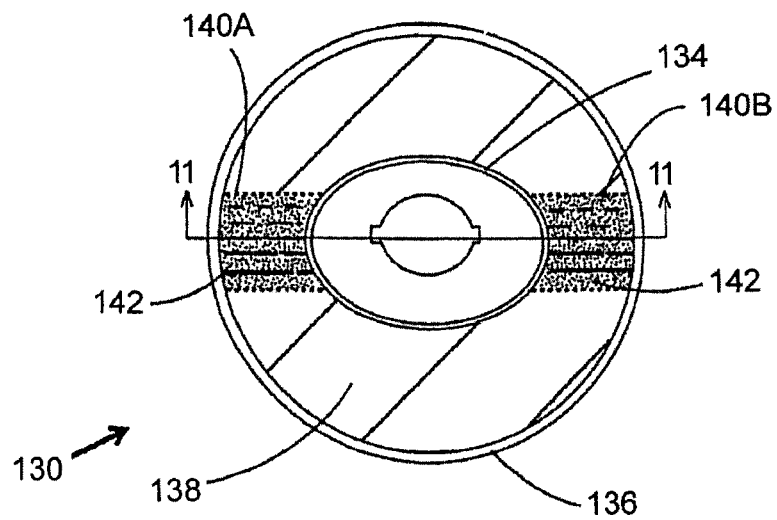
FIG. 10 is a top view of yet another embodiment of an electrically conductive mechanical vibration isolator in accordance with the disclosed inventive concept including a conductive liquid.
Figure 11:
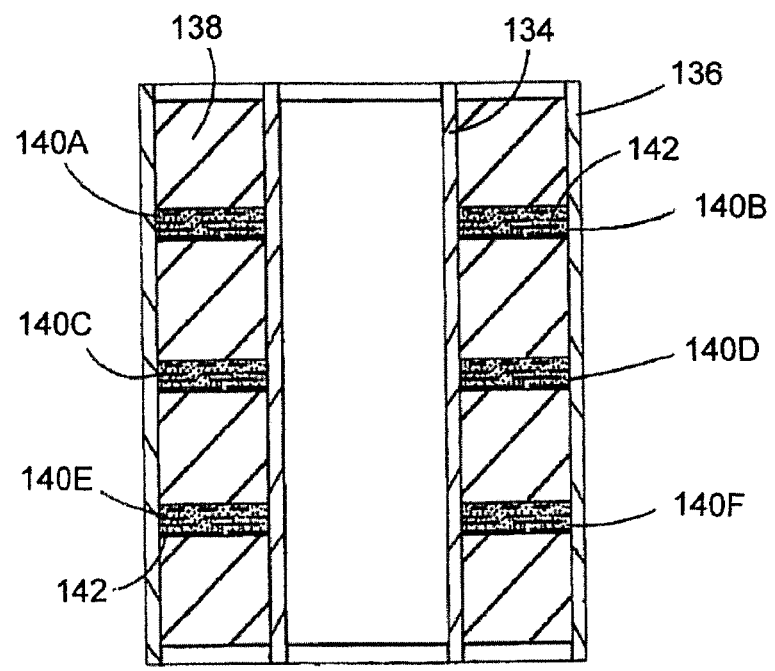
FIG. 11 is a cross-sectional view of the conductive isolator taken along line 11-11 of FIG. 10.
Figure 12:
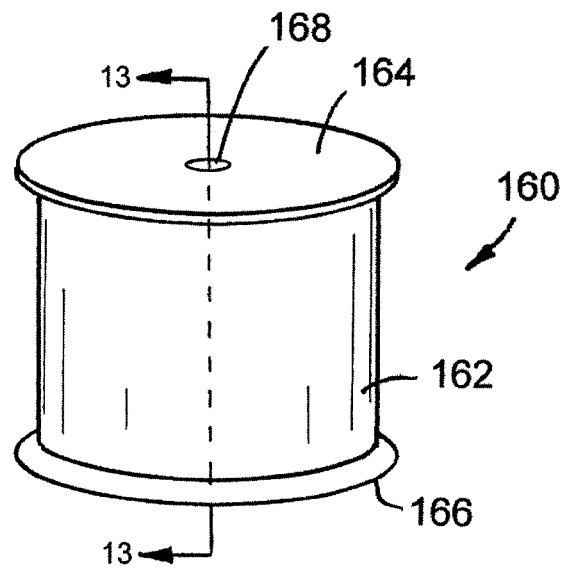
FIG. 12 is a perspective view of yet another embodiment of an electrically conductive mechanical vibration isolator in accordance with the disclosed inventive concept including a pair of washers.

In yet a further embodiment of the disclosed present invention, a conductive isolator 130 is shown in FIGS. 10 and 11. The conductive isolator 130 comprises an inner shell 134, an outer shell 136, and an elastomer 138 disposed therebetween. The elastomer 138 includes at least one through bore formed therein defining a chamber or channel 140A extending between the inner shell 134 and the outer shell 136.

The conductive isolator 130 further comprises a conductive liquid 142 stored within the channel 140A for providing an electrical path between the inner shell 134 and the outer shell 136. The conductive liquid 142 is retained within the channel 140A as the sides of the elastomer are compressed against the inner shell and the outer shell 136.

Conductive liquids may comprise any suitable liquid metal, such as mercury, or a water-based slurry mixed with conductive particles or powders, such as silver, copper, gold, aluminum, brass, nickel, iron, bronze, inconel, molybdenum, molybdenum carbide, monel, steel (including stainless steel), and the like or any combination thereof. Alternatively, a base liquid may be used instead of water, such as a mineral liquid, silicone liquid, ester liquid, petroleum hydrocarbon liquid, synthetic hydrocarbon liquid, phenyl ether, polyglycol, polydimethyl silicone fluids, polydimethyl siloxane polymers, fluoro-silicone liquid, poly-a-olefin, diesters, pall esters, alkyl naphthalene, alkyl benzene, polyoxyalkylene glycol, polyphenyl ether, dialkyl diphenyl ether, castor oil liquid, and the like, or any combination thereof. The base liquid or water functions to sufficiently distribute the conductive particles throughout the conductive liquid 142.

It is to be understood that any number of channels may be formed within the elastomer 138 for increasing the amount of conductive liquid 142 capable of being stored therein. As shown in FIG. 10, a pair of channels 140A, 140B is illustrated.

From the cross-sectional side view shown in FIG. 11, a plurality of channels 140A-F is illustrated and formed within the elastomer 138 at any suitable location along the length thereof. While the channels 140A-F are illustrated as being substantially horizontal, it is to be understood that the channels 140A-F may extend at any suitable angle between the inner shell 134 and the outer shell 136. Additionally, the channels 140A-F are not limited to being parallel to one another. Thus, the channels 140A-F may each be oriented in any suitable fashion without respect to the other channels 140A-F.

In yet another embodiment, as shown in FIGS. 12 through 15, the disclosed inventive concept provides a conductive isolator 160 comprising an elastomer 162 disposed between an upper plate or washer 164 and a lower plate or washer 166. The elastomer 162 is identical to the elastomer described in the above embodiments and, thus, may be fabricated from silicone, rubber, polyurethane, fluoropolymer, and the like.

It is to be understood that the washers 164, 166 are used in place of the shells 18, 20 disclosed in the above embodiments. However, the washers 164, 166 still function as opposing ends of an electrical path. Thus, the washers 164, 166 are formed from a conductive metallic material such as, iron, steel (including stainless steel), copper, aluminum, chromate, nickel, and the like. The washers 164, 166 may be bonded to opposite ends of the elastomer 162 by any suitable means such as by using an adhesive, epoxy, silicone compound, and the like.

As shown, a channel 168 is formed extending entirely through the washers 164, 166 and the elastomer 162. The channel 168 facilitates mounting the conductive isolator 160 onto an electric component and a vehicle support structure using any suitable means such as a fastener or the like, as discussed below.

The conductive isolator 160 further comprises at least one conductor 170, such as a spring, having a first end 172 and a second end 174. The conductor 170 extends through the elastomer 162 in order to interconnect the washers 164, 166 at opposite ends 172, 174 thereof. This creates an electrical path between the washers 164, 166 for grounding an electrical component. As discussed above, and shown in FIG. 13, the conductor 170 may, optionally, include at least one winding formed in the body thereof to define a coil. This allows the conductor 170 to withstand movement between the washers 164, 166 and prevent its ends 172, 174 from being disengaged from the washers 164, 166.

Figure 13:
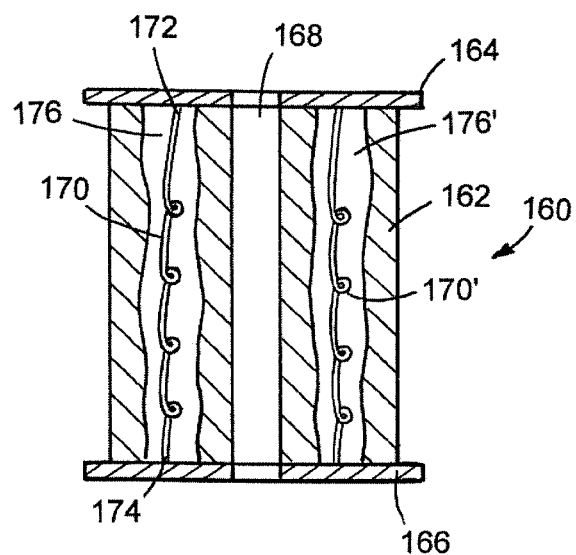
FIG. 13 is a cross-sectional view of the conductive isolator taken along line 13-13 of FIG. 12.

As shown in FIG. 13, the conductive isolator 160 includes a pair of conductors 170, 170' disposed within pockets 176, 176', respectively, formed within the elastomer 162. Utilizing more than one conductor increases the conduction between the washers 164, 166 and further improves the life span of the conductive isolator 160 in the possible event one of the conductors 170, 170' fails.

Figure 14:
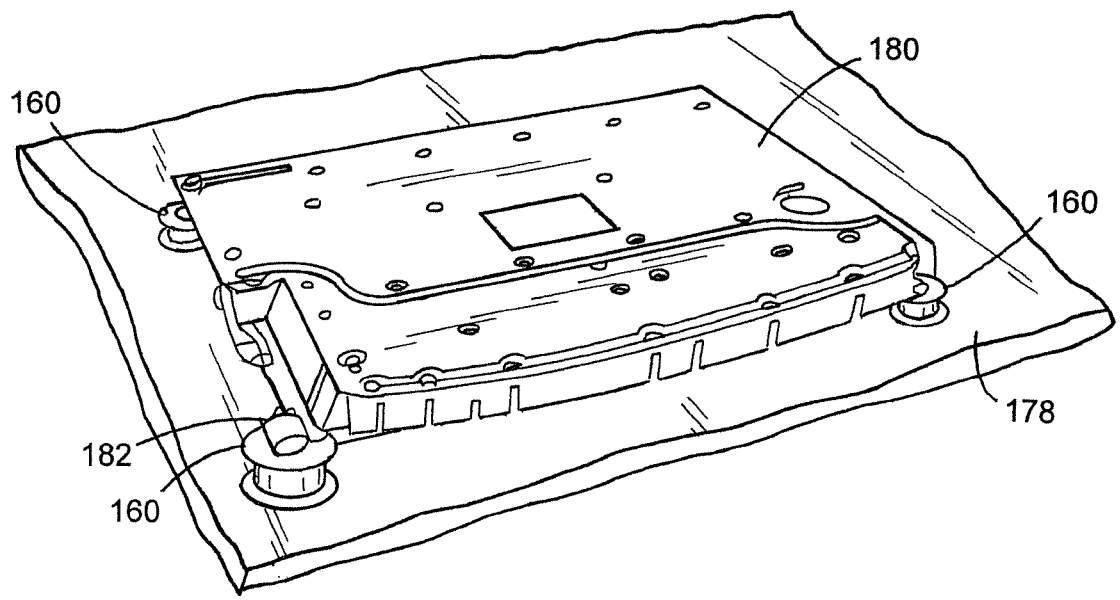
FIG. 14 is an environmental view showing the conductive isolator positioned between a vehicle support structure and an electric vehicle battery.

As noted above, the disclosed inventive concept may be utilized in any suitable location on a vehicle for providing an electrical path between an electrical component and a vehicle support structure and facilitating grounding the electrical component. Thus, as shown in FIG. 14, a plurality of conductive isolators 160 is positioned between a vehicle support structure 178 and an electric vehicle battery 180 for absorbing vibration and grounding the battery 180. The conductive isolator 160 is mounted to the battery 180 and the vehicle support structure 178 by any suitable means such as a mounting bracket 182 and fastener arrangement which engages the channel 164 formed in the conductive isolator 160.

Figure 15:
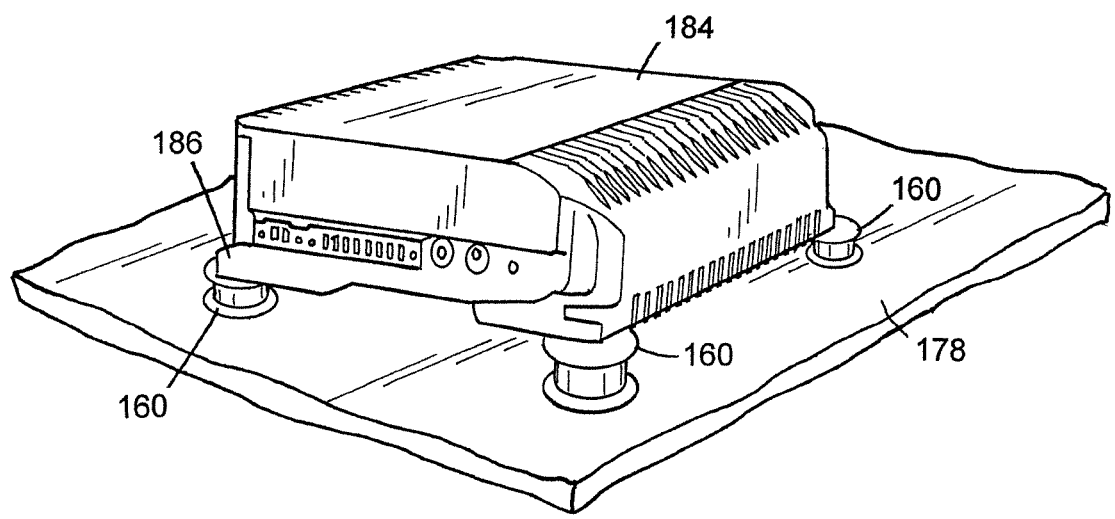
FIG. 15 is an environmental view showing the conductive isolator positioned between a vehicle support structure and an electric vehicle module.

Similarly, as shown in FIG. 15, a plurality of conductive isolators 160 is positioned between the vehicle support structure 178 and a vehicle module 184 and mounted thereto for absorbing vibration and grounding the module 184. Such vehicle modules may include electronic/engine control modules (ECM), powertrain control modules (PCM), transmission control modules (TCM), brake control modules (BCM), central control modules (CCM), central timing modules (CTM), general electronic modules (GEM), body control modules (BCM), suspension control modules (SCM), and the like. It is to be understood that the uses and locations for the disclosed inventive concept illustrated herein are not to be limiting and other suitable uses would be appreciated by one of ordinary skill in the art.

From the above, it is to be appreciated that defined herein is a new and unique electrically conductive mechanical vibration isolator for providing an electrical path between parts of a vehicle.

One skilled in the art will readily recognize from such discussion, and from the accompanying drawings and claims, that various changes, modifications, and other variations can be made therein without departing from the spirit and fair scope of the disclosed inventive concept as defined by the following claims.

LIST OF REFERENCE NUMERALS

10 Conductive isolator assembly
12 Support structure
13 Engine
14 Conductive isolator
15 Engine attachment bracket
16 First support bracket
17 Second support bracket
18 Attachment leg of first support bracket
18' Attachment leg of first support bracket
19 Inner shell
20 Outer shell
22 Elastomer
24 Conductive wire
26 Body of conductor
28 First end of conductor
29 First contact point
30 Second end of conductor
31 Second contact point
32 Windings in body of conductor
50 Conductive isolator (second embodiment)
54 Inner shell
56 Outer shell
58 Elastomer
60 Conductive wire
62 Body of conductor
64 First end of conductor
66 Second end of conductor
68 Pocket
80 Conductive isolator (third embodiment)
84 Inner shell
86 Outer shell
88 Elastomer
90 Conductive wire
90' Conductive wire
92 Body of conductor
94 First end of conductor
94' First end of conductor
96 Second end of conductor
96' Second end of conductor
97 Pocket
97' Pocket
98 Windings in body of conductor
110 Conductive isolator (fourth embodiment)
114 Inner shell
116 Outer shell
118 Elastomer
120 Conductive particulates
130 Conductive isolator (fifth embodiment)
134 Inner shell
136 Outer shell
138 Elastomer
140A Channel
140B Channel
140C Channel
140D Channel
140E Channel
140F Channel
142 Conductive liquid
160 Conductive isolator (sixth embodiment)
162 Elastomer
164 Upper washer
166 Lower washer
168 Channel
170 Conductor
170' Conductor
172 First end of conductor
174 Second end of conductor
176 Pocket
176' Pocket
178 Support structure
180 Battery
182 Mounting bracket of battery 184 Module
186 Mounting bracket of module

What is claimed is:

1. A conductive vibration isolator for use in a vehicle to provide electrical continuity between an electrical component and a support structure, the isolator comprising:
   a hollow inner shell attached to one of the electrical component or the support structure, said inner shell having a long axis;
   an outer shell attached to the other of the electrical component or the support structure, said outer shell having a long axis that is coaxial with said long axis of said inner shell;
   an elastomer between said shells, said elastomer having a plurality of channels formed between said shell, each one of said plurality of channels extending between said inner and outer shells; and
   a conductive liquid disposed within each one of said plurality of channels,
   wherein the inner and outer shells are coupled together and maintained in relatively fixed positions with respect to one another during use with the elastomer absorbing kinetic energy and vibrations between the inner and outer shell.

2. The conductive vibration isolator of claim 1, wherein said conductive liquid is a water-based slurry mixed with conductive particles selected from the group consisting of silver, copper, gold, aluminum, brass, nickel, iron, bronze, inconel, molybdenum, molybdenum carbide, monel, and stainless steel.

3. The conductive vibration isolator of claim 1, wherein said inner and outer shells are manufactured from a material selected from the group consisting of iron, steel, stainless steel, copper, aluminum, chromate, and nickel.

4. A conductive vibration isolator for use in a vehicle to provide electrical continuity between an electrical component and a support structure, the isolator comprising:
   a hollow inner shell attached to one of the electrical component or the support structure, said inner shell having a long axis;
   an outer shell attached to the other of the electrical component or the support structure, said outer shell having a long axis that is coaxial with said long axis of said inner shell;
   an elastomer between said shells, said elastomer having a plurality of channels formed between said shells, each one of said plurality of channels extending between said inner and outer shells; and
   a conductive liquid disposed within each one of said plurality of channels,
   wherein the positions of the inner and outer shells relative to one another are maintained in relatively fixed positions during use with the elastomer absorbing kinetic energy and vibrations between the inner and outer shell.

5. The conductive vibration isolator of claim 4, wherein said conductive liquid is a water-based slurry mixed with conductive particles selected from the group consisting of silver, copper, gold, aluminum, brass, nickel, iron, bronze, inconel, molybdenum, molybdenum carbide, monel, and stainless steel.

6. The conductive vibration isolator of claim 4, wherein said inner and outer shells are manufactured from a material selected from the group consisting of iron, steel, stainless steel, copper, aluminum, chromate, and nickel.

* * * * *